(12) United States Patent
Takaoka et al.

(10) Patent No.: US 12,203,311 B2
(45) Date of Patent: Jan. 21, 2025

(54) DRIVING DEVICE

(71) Applicant: HI-LEX CORPORATION, Takarazuka (JP)

(72) Inventors: Hiroyuki Takaoka, Hyogo (JP); Koji Kuraoka, Hyogo (JP)

(73) Assignee: HI-LEX CORPORATION, Hyogo (JP)

( * ) Notice: Subject to any disclaimer, the term of this patent is extended or adjusted under 35 U.S.C. 154(b) by 0 days.

(21) Appl. No.: 18/039,499

(22) PCT Filed: Dec. 2, 2021

(86) PCT No.: PCT/JP2021/044191
§ 371 (c)(1),
(2) Date: May 31, 2023

(87) PCT Pub. No.: WO2022/118908
PCT Pub. Date: May 9, 2022

(65) Prior Publication Data
US 2024/0003178 A1    Jan. 4, 2024

(30) Foreign Application Priority Data

Dec. 2, 2020 (JP) .................................. 2020-200332

(51) Int. Cl.
*E05F 15/605*    (2015.01)
*B60J 5/10*    (2006.01)

(52) U.S. Cl.
CPC ............. *E05F 15/605* (2015.01); *B60J 5/106* (2013.01); *B60J 5/107* (2013.01);
(Continued)

(58) Field of Classification Search
CPC ....... E05F 15/605; E05F 15/622; B60J 5/106; B60J 5/12; B60J 5/107; B60J 1/18; B62D 25/10
(Continued)

(56) References Cited

U.S. PATENT DOCUMENTS 5,992,918 A * 11/1999 Gobart .................. B60J 5/0473
296/146.13
6,454,341 B2 * 9/2002 Tolinski .................. B60J 5/104
296/106
(Continued)

FOREIGN PATENT DOCUMENTS

| JP | 61-101088 | 6/1986 |
| JP | 2005-299232 | 10/2005 |
| JP | 2009-173254 | 8/2009 |

OTHER PUBLICATIONS

International Search Report and Written Opinion for International Application No. PCT/JP2021/044191 mailed on Jan. 18, 2022, 9 pages.

*Primary Examiner* — Marcus Menezes
(74) *Attorney, Agent, or Firm* — Amin, Turocy & Watson, LLP

(57) ABSTRACT

A driving device is a driving device driving a door that includes an upper door and a lower door rotatably connected to the upper door, and includes: a driving portion that is provided at a position spaced apart from a connecting portion rotatably connecting the upper door and the lower door and generates a driving force for driving the upper door or the lower door; and an adjusting portion that changes a degree of folding of the lower door with respect to the upper door based on the driving force. Such a driving device can enhance the degree of freedom in designing a door.

2 Claims, 15 Drawing Sheets

(52) U.S. Cl.
CPC ... *E05Y 2201/654* (2013.01); *E05Y 2201/664* (2013.01); *E05Y 2600/46* (2013.01); *E05Y 2900/546* (2013.01)

(58) Field of Classification Search
USPC .................................................. 296/146.13
See application file for complete search history.

(56) References Cited

U.S. PATENT DOCUMENTS

| | | | |
|---|---|---|---|
| 6,471,284 B2* | 10/2002 | Landmesser | B60J 5/101 296/146.8 |
| 11,448,002 B2* | 9/2022 | Lee | B60J 5/101 |
| 2020/0123830 A1* | 4/2020 | Scheuring | E05F 3/221 |

* cited by examiner

DRIVING DEVICE

TECHNICAL FIELD

The present invention relates to a driving device.

BACKGROUND ART

Patent Literature (hereinafter, referred to as PTL) 1 discloses a driving unit for driving a door including an upper door and a lower door rotatably connected to the upper door. The driving unit disclosed in PTL 1 is a device for changing the angle of the lower door with respect to the upper door. The driving unit includes a motor, a speed reducer, and an arm, and also includes a hinge that rotatably supports the lower door. The hinge is a connecting portion that connects the upper door and the lower door.

One end of the arm is fixed to the upper door, and the other end is fixed to a supporting shaft of the speed reducer. Rotating the arm about the supporting shaft changes the relative angle of the lower door with respect to the upper door.

CITATION LIST

Patent Literature

PTL 1
Japanese Patent Application Laid-Open No. 2009-173254

SUMMARY OF INVENTION

Technical Problem

However, in the driving unit disclosed in PTL 1, a motor serving as a driving portion is integrally combined with a hinge serving as a connecting portion. In this case, the capacity of the motor is determined depending on specifications such as the weight of the door, and it is likely that the motor having a higher capacity is large in size, which makes it difficult to place the motor in combination with the hinge. As a result, there is a problem in that the degree of freedom in designing the door is possibly limited.

An object of the present invention is to provide a driving device capable of enhancing the degree of freedom in designing a door.

Solution to Problem

A driving device according to the present invention is a driving device driving a door that includes an upper door and a lower door rotatably connected to the upper door, and includes: a driving portion that is provided at a position spaced apart from a connecting portion rotatably connecting the upper door and the lower door and generates a driving force for driving the upper door or the lower door; and an adjusting portion that changes a degree of folding of the lower door with respect to the upper door based on the driving force.

Advantageous Effects of Invention

According to the present invention, it is possible to obtain a driving device capable of enhancing the degree of freedom in designing a door.

DESCRIPTION OF EMBODIMENTS

Hereinafter, an embodiment of the present invention will be described in detail with reference to the drawings.

Figure 1:
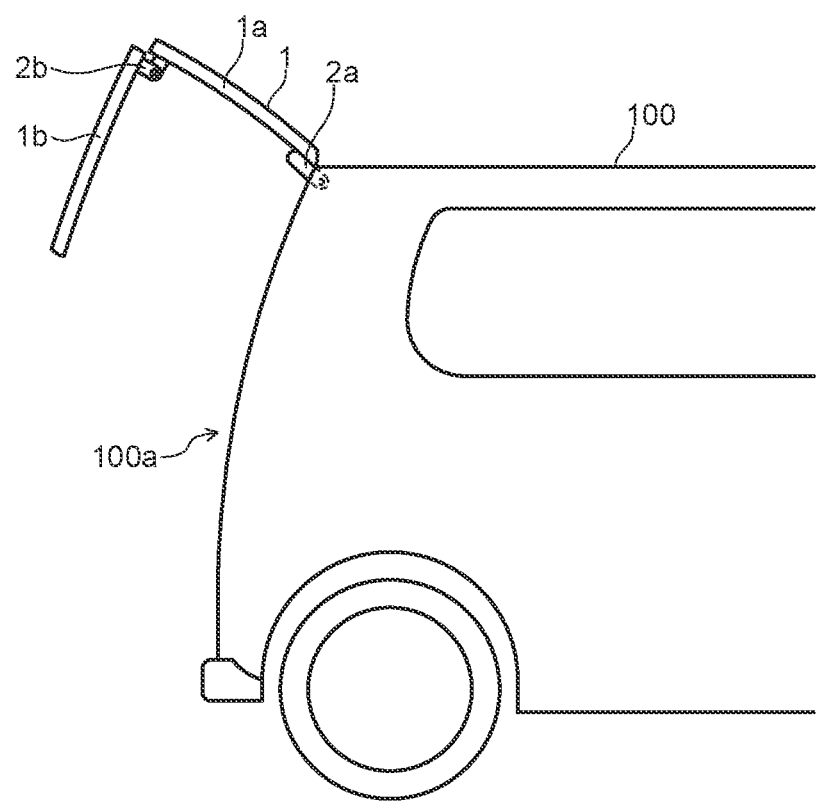
FIG. 1 is an external view of an example of a rear portion of vehicle 100 to which a driving device according to an embodiment of the present invention is applied.

FIG. 1 is an external view of an example of a rear portion of vehicle 100 to which a driving device according to an embodiment of the present invention is applied. Vehicle 100 includes door 1 that puts opening portion 100a formed at the rear portion of vehicle 100 into an opened or closed state.

The opened state is a state in which opening portion 100a is opened, and a state in which a load or the like can be taken in and out of vehicle 100 via opening portion 100a. The closed state is a state in which opening portion 100a is closed.

Door 1 is, for example, a folding type tailgate including upper door 1a and lower door 1b. Note that door 1 is not limited to the tailgate of vehicle 100, and may be, for example, a flip-up type entrance door or the like.

Upper door 1a is rotatably attached to a vehicle body via two hinges $2a_1$ and $2a_2$. Lower door 1b is rotatably connected to upper door 1a via two hinges $2b_1$ and $2b_2$. Two hinges $2b_1$ and $2b_2$ are examples of connecting portions that connect upper door 1a and lower door 1b. In the following description, two hinges $2a_1$ and $2a_2$ will be simply referred to as "hinge 2a" when they are not distinguished from each other. Further, in the following description, two hinges $2b_1$ and $2b_2$ will be simply referred to as "hinge 2b" when they are not distinguished from each other.

Figure 2A:
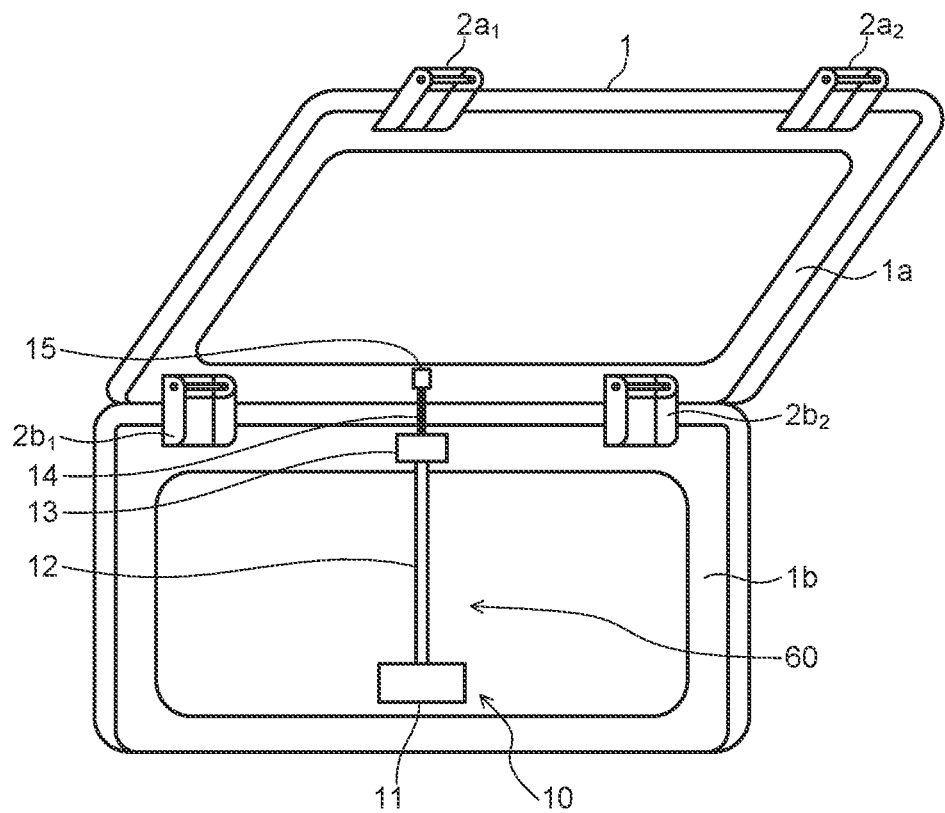
FIG. 2A is an enlarged view of an example of door 1 to which driving device 10 according to the embodiment of the present disclosure is provided.
Figure 2B:
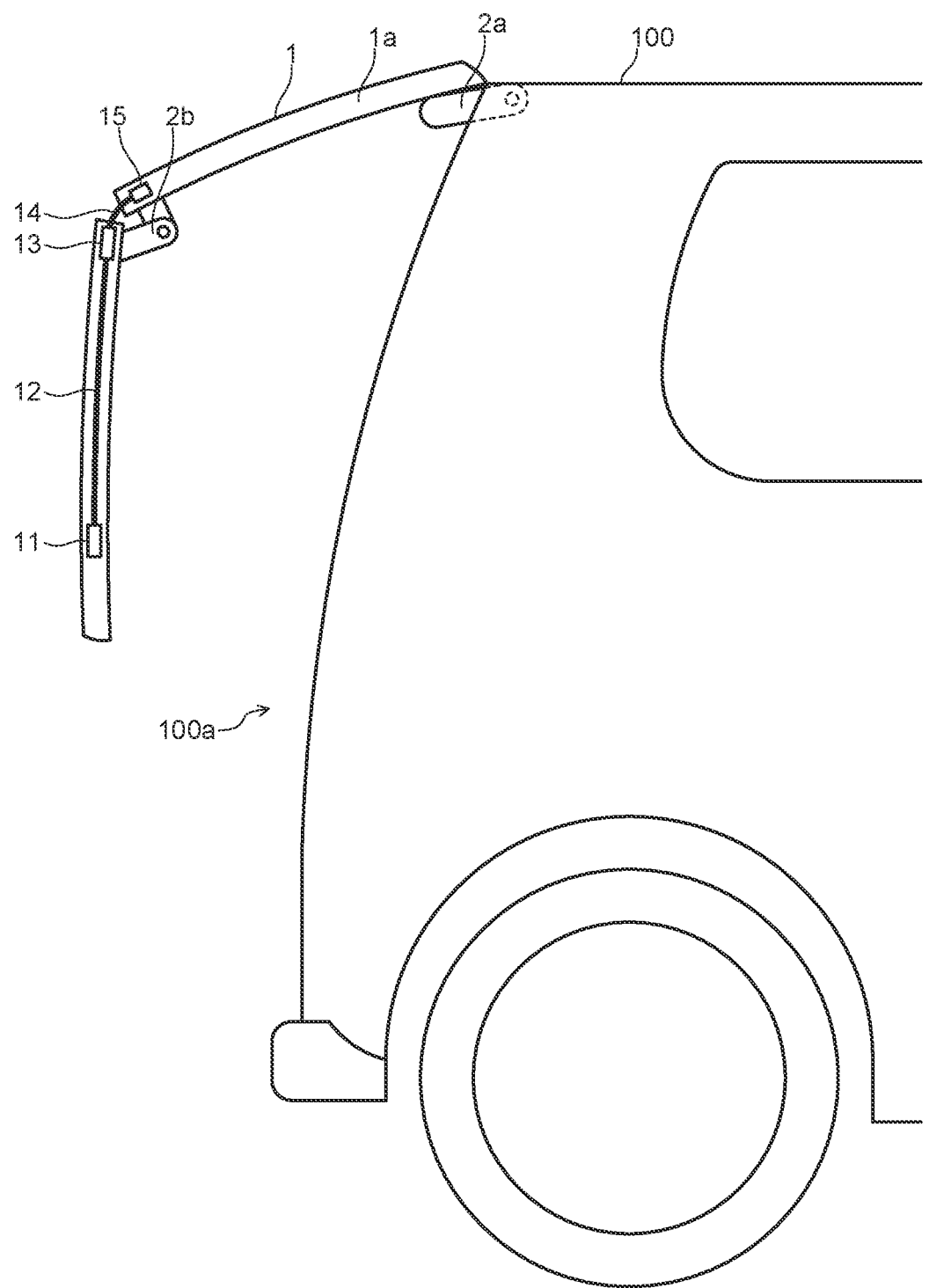
FIG. 2B is another enlarged view of an example of door 1 to which driving device 10 according to the embodiment of the present disclosure is provided.
Figure 3:
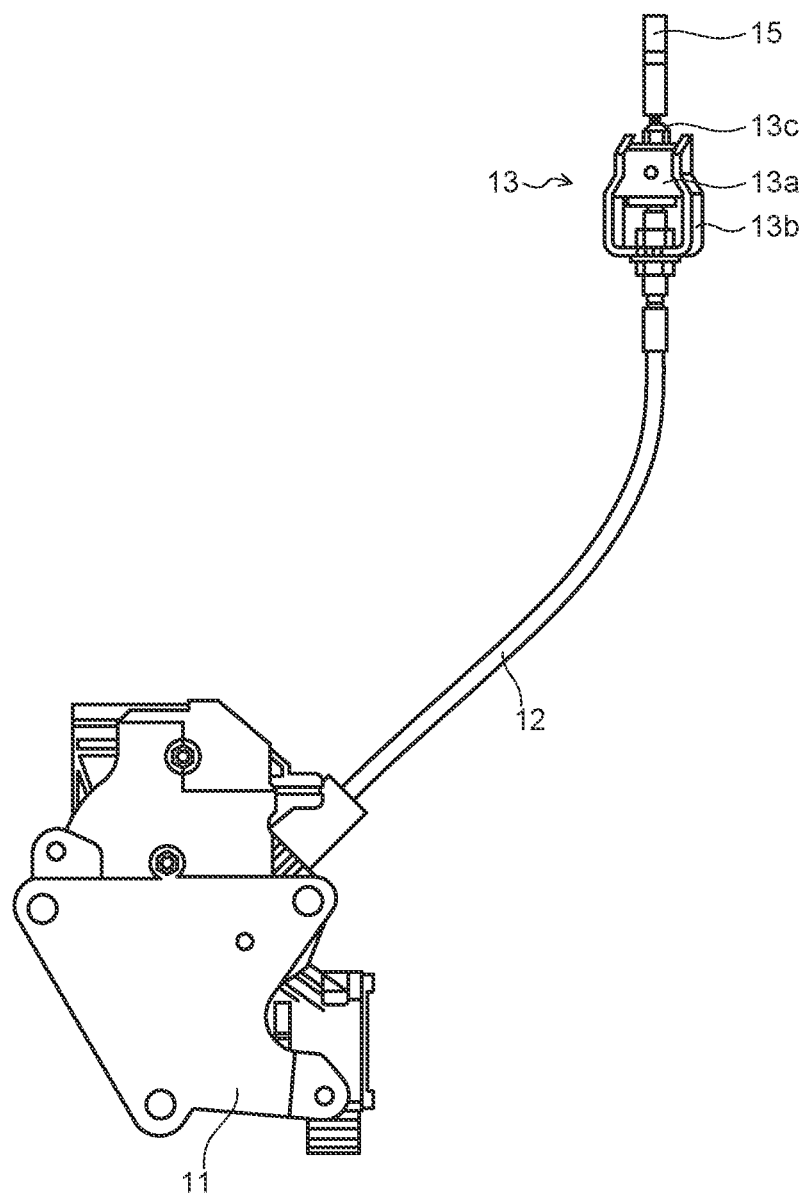
FIG. 3 illustrates an exemplary configuration of driving device 10 according to the embodiment of the present invention.

Next, an exemplary configuration of driving device 10 according to the embodiment of the present invention will be described with reference to FIGS. 2 and 3. FIGS. 2A and 2B are enlarged views of an example of door 1 to which driving device 10 according to the embodiment of the present disclosure is provided. FIG. 2A is a perspective view of door 1, and FIG. 2B is a side view of door 1. FIG. 3 illustrates an exemplary configuration of driving device 10 according to the embodiment of the present invention.

As illustrated in FIG. 2A, two types of hinges 2a and 2b and driving device 10 are provided in door 1. Two types of hinges 2a and 2b are placed apart from each other in the left-right direction of door 1, that is, in the vehicle width direction. At least one of driving portion 11 and/or adjusting portion 60 is placed between two hinges 2b provided apart from each other in the vehicle width direction.

Note that the number of hinges 2a and the number of hinges 2b are each not limited to two and may each be at least one or more. For example, when each of the numbers of hinges 2a and hinges 2b is one, hinge 2a and hinge 2b are provided in the center portion of door 1 in the vehicle width direction, and driving device 10 is provided in the center portion of door 1 in the vehicle width direction or in the vicinity of the edge portion of lower door 1b in the left-right direction.

[Configuration of Driving Device 10]

Driving device 10 includes driving portion 11, outer casing 12, guide portion 13, cable 14, and cable end 15.

[Configuration of Driving Portion 11]

Driving portion 11 is a device that generates a driving force for driving lower door 1b by winding and unwinding cable 14. Upper door 1a is driven by a Power Lift Gate (PLG) unit.

Driving portion 11 is provided at a position spaced apart from hinges 2b by a predetermined distance, in the vicinity of the lower end portion of lower door 1b, and in the vicinity of the center portion of lower door 1b in the left-right direction.

Note that the position where driving portion 11 is provided is not limited to the vicinity of the center portion of lower door 1b in the left-right direction, and may be the vicinity of the edge portion of lower door 1b in the left-right direction. However, when lower door 1b is a door in which a recessed portion recessed from the inside of the vehicle toward the outside of the vehicle is formed, it is preferred that driving portion 11 be provided in a space formed in the recessed portion of lower door 1b.

Such a configuration can effectively use the recessed portion of lower door 1b, and can avoid narrowing the load compartment by driving portion 11.

Driving portion 11 includes a motor and a power transmission portion such as a worm gear that transmits the rotation of the motor to a drum.

When the motor rotates in the forward direction, the rotational motion of the motor is transmitted to the drum via the power transmission portion, and the drum rotates in the forward direction. In this case, cable 14 is wound around the drum.

On the other hand, when the motor rotates in the opposite direction, the drum rotates in the opposite direction. In this case, cable 14 is unwound from the drum.

[Configuration of Adjusting Portion 60]

Adjusting portion 60 changes the degree of folding of lower door 1b with respect to upper door 1a based on the driving force generated by the motor. Specifically, adjusting portion 60 includes the above-described drum, above-described driving portion 11, and cable 14.

Adjusting portion 60 generates a tensile force by which cable 14 is pulled by winding cable 14 through the rotation of the drum.

[Configuration of Cable 14]

Cable 14 transmits a tensile force by which upper door 1a and lower door 1b are pulled toward each other based on the driving force generated by driving portion 11. Cable 14 is, for example, a flexible cable obtained by twisting metal wires, resin fiber wires, or the like.

One end of cable 14 is connected to the drum included in driving portion 11. The other end of cable 14 extends from driving portion 11 towards guide portion 13, and further extends to cable end 15.

Of the entire cable 14, a portion from driving portion 11 to guide portion 13 is covered with outer casing 12 for protecting cable 14.

[Configuration of Cable End 15]

Cable end 15 is a metallic member for fixing the end portion of cable 14 to upper door 1a. Cable end 15 is fixed in the vicinity of the lower end of upper door 1a, for example.

[Configuration of Guide Portion 13]

Guide portion 13 is a member that movably supports cable 14 and changes its guide direction.

As illustrated in FIG. 3, guide portion 13 includes guide 13a for conveying cable 14 illustrated in FIG. 2A, bracket 13b for fixing guide 13a to door 1 illustrated in FIG. 2A, and stopper 13c for pulling cable 14 illustrated in FIG. 2A out to the outside of guide 13a and contacting with cable end 15 to stop the movement of cable end 15 when cable 14 is drawn to the side of guide 13a.

In driving device 10 configured as described above, winding cable 14 can decrease the degree of folding of lower door 1b with respect to upper door 1a.

Further, unwinding cable 14 can increase the degree of folding of lower door 1b with respect to upper door 1a. A specific example of an operation of driving device 10 will be described later.

Next, an operation of driving device 10 will be described with reference to FIGS. 4A to 11B. FIGS. 4A to 11B are diagrams for describing an operation of driving device 10.

FIGS. 4A, 5A, 6A, 7A, 8A, 9A, 10A, and 11A illustrate an opening or closing state of door 1, and FIGS. 4B, 5B, 6B, 7B, 8B, 9B, 10B, and 11B illustrate an operational state of driving device 10.

Hereinafter, an operation of driving device 10 when door 1 is opened will be described with reference to FIGS. 4 to 7.

Figure 4A:
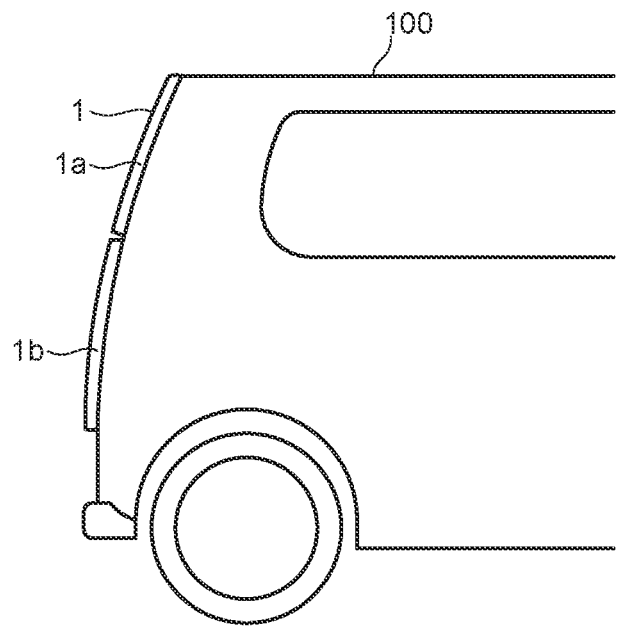
FIG. 4A is a diagram for describing an operation of driving device 10.
Figure 4B:
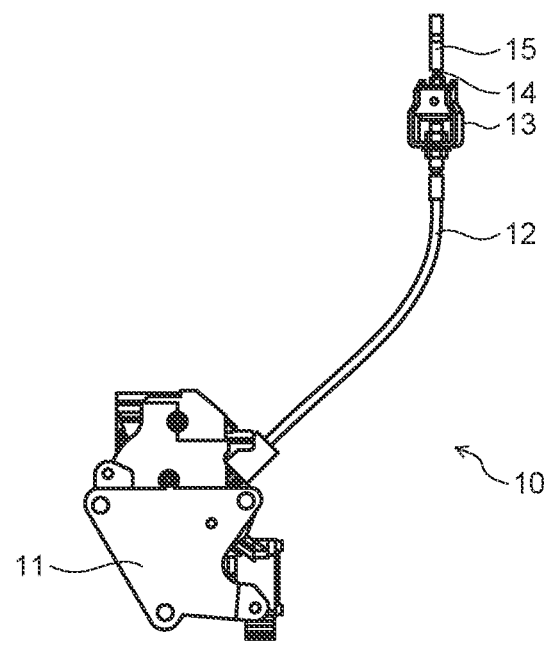
FIG. 4B is another diagram for describing the operation of driving device 10.

When door 1 is fully closed as illustrated in FIG. 4A, cable end 15 is positioned close to guide portion 13 as illustrated in FIG. 4B.

Figure 5A:
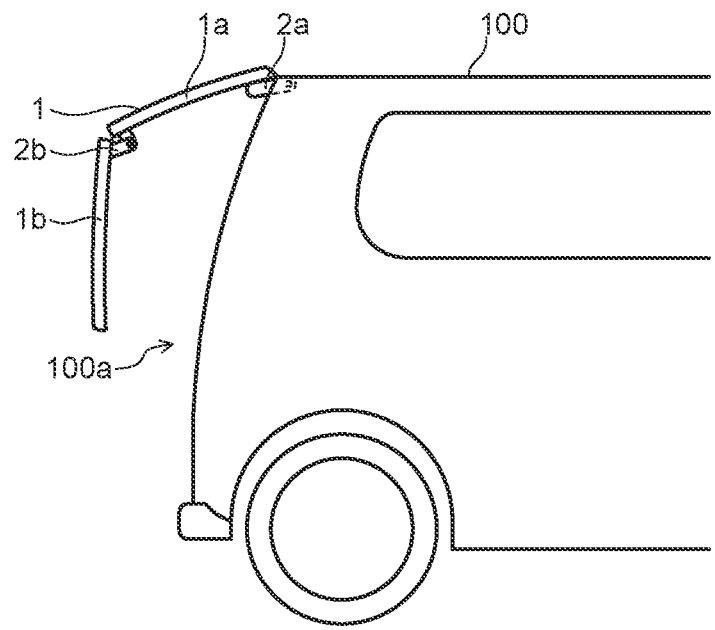
FIG. 5A is still another diagram for describing the operation of driving device 10.
Figure 5B:
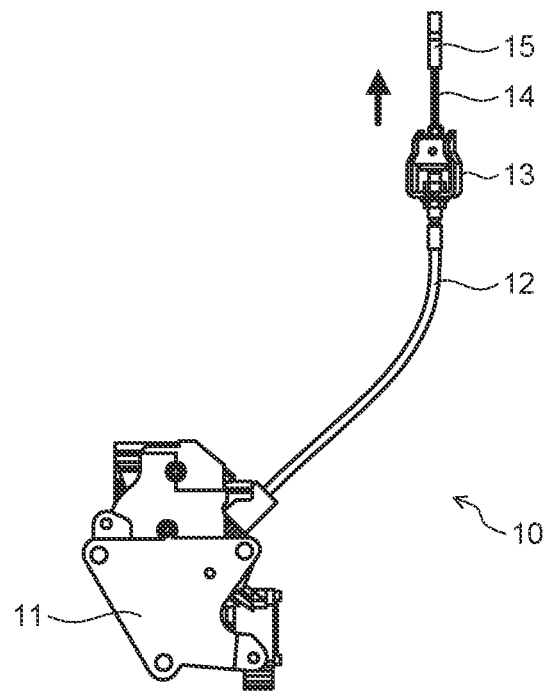
FIG. 5B is still another diagram for describing the operation of driving device 10.

When door 1 in a fully-closed state is opened, as illustrated in FIG. 5B, cable 14 is unwound along with the opening operation of upper door 1a. This reduces the tensile force by which upper door 1a and lower door 1b are pulled toward each other. Thus, as illustrated in FIG. 5A, lower door 1b hangs down by gravity, and the degree of folding of lower door 1b with respect to upper door 1a increases.

Figure 6A:
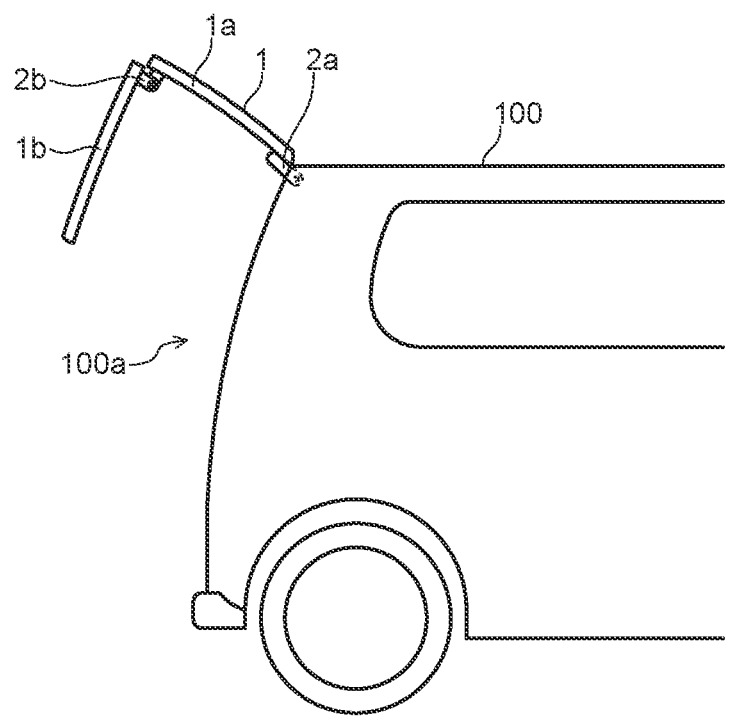
FIG. 6A is still another diagram for describing the operation of driving device 10.
Figure 6B:
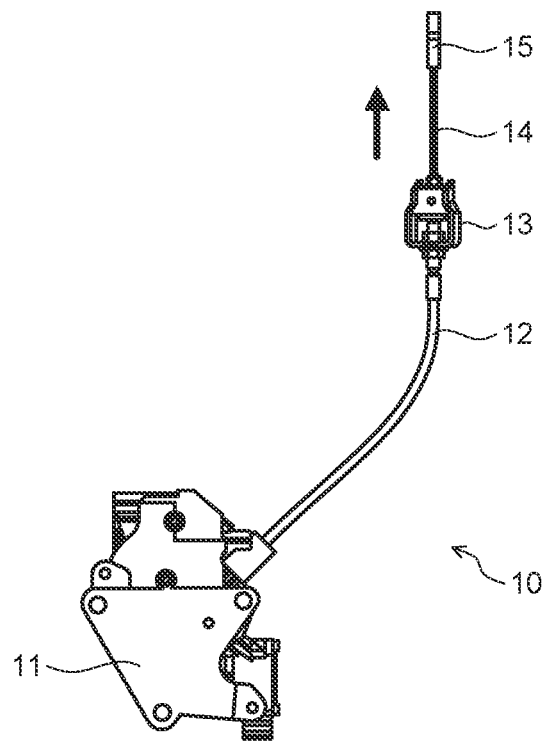
FIG. 6B is still another diagram for describing the operation of driving device 10.

When upper door 1a is further opened, cable 14 is further unwound as illustrated in FIG. 6B. Thus, as illustrated in FIG. 6A, the degree of folding of lower door 1b with respect to upper door 1a further increases.

As described above, cable 14 is unwound along with the opening operation of upper door 1a, so that the degree of folding of lower door 1b with respect to upper door 1a increases. Accordingly, when, for example, an obstacle such as a person or a wall is present in front of door 1, contacting of lower door 1b with the obstacle can be avoided.

Figure 7A:
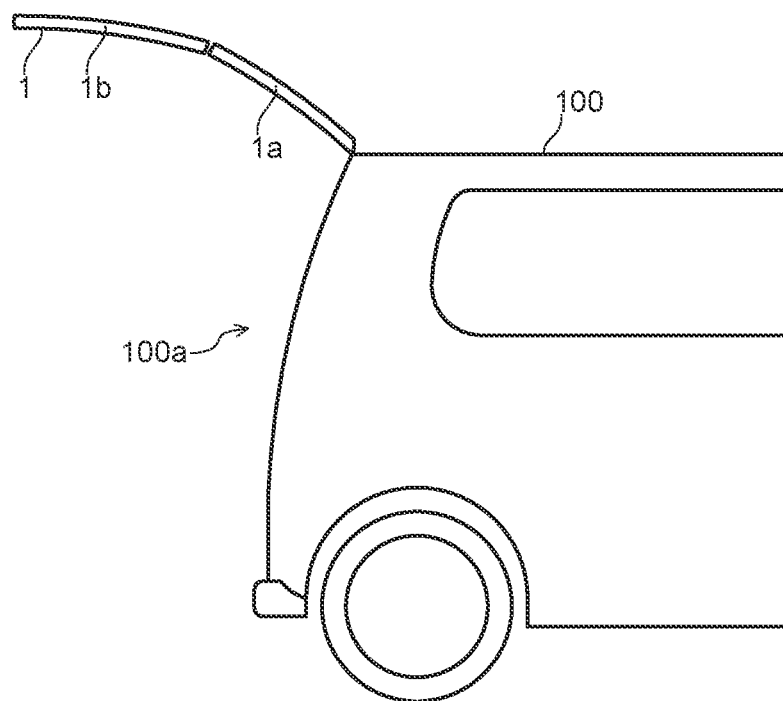
FIG. 7A is still another diagram for describing the operation of driving device 10.
Figure 7B:
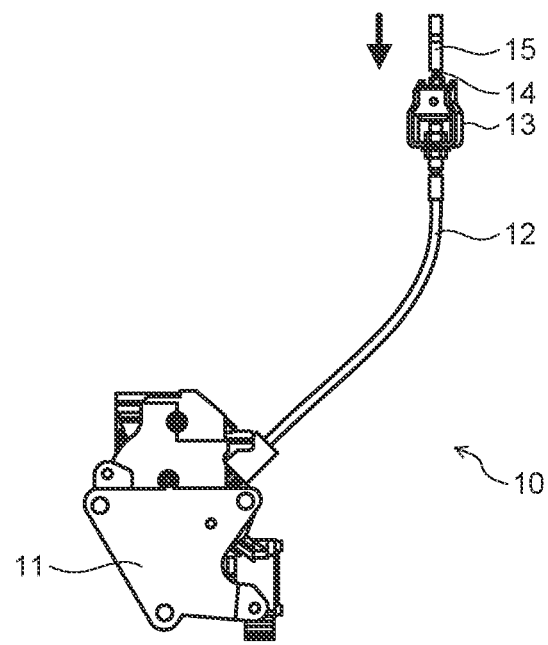
FIG. 7B is still another diagram for describing the operation of driving device 10.

When cable 14 is wound in a state where upper door 1a is fully opened, as illustrated in FIG. 7A, the flat portion at the end portion of lower door 1b is pushed against the flat portion at the end portion of upper door 1a, and the degree of folding of lower door 1b with respect to upper door 1a decreases, so that upper door 1a and lower door 1b are held in a state where upper door 1a and lower door 1b are pulled toward each other, thereby fully opening door 1. Note that when the distance from the wall or the like present around door 1 to the vehicle is short, door 1 cannot be fully opened; therefore, the amount of cable 14 to be wound may be decreased and lower door 1b may be kept folded with respect to upper door 1a.

Next, an operation of driving device 10 when door 1 is closed will be described with reference to FIGS. 8 to 11.

Figure 8A:
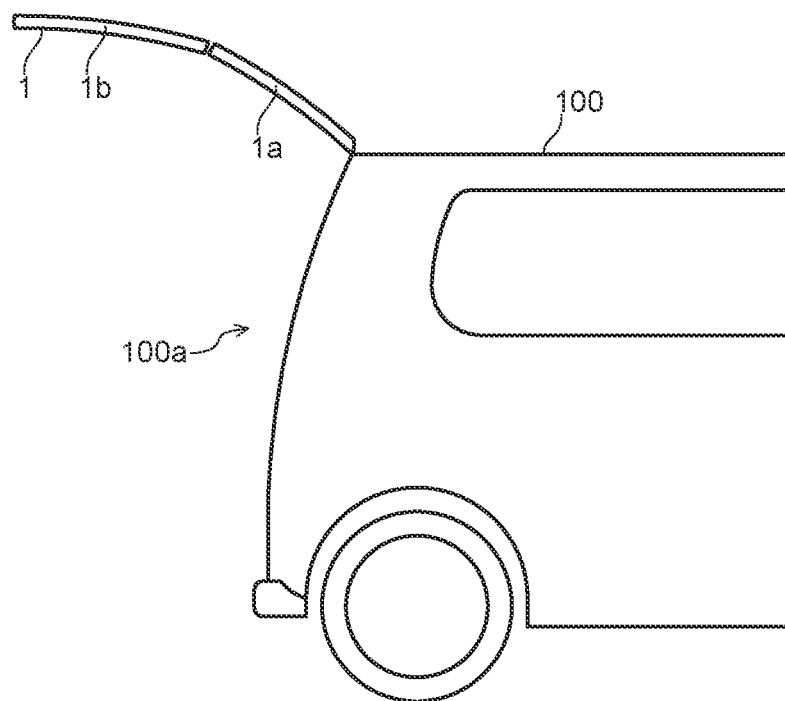
FIG. 8A is still another diagram for describing the operation of driving device 10.
Figure 8B:
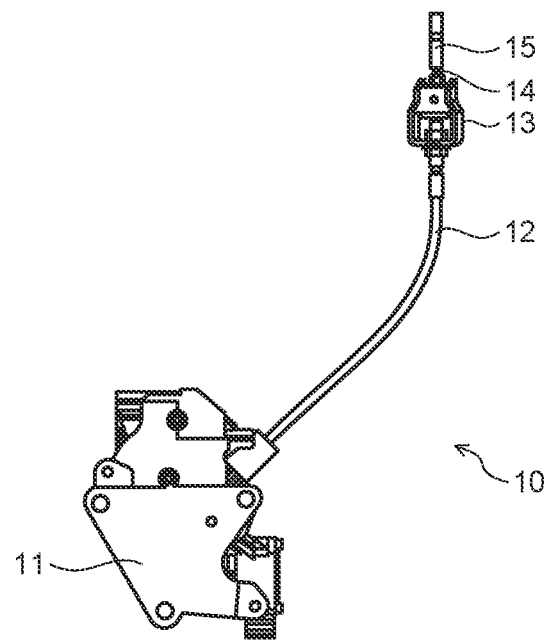
FIG. 8B is still another diagram for describing the operation of driving device 10.

Cable end 15 is positioned closely to guide portion 13 when door 1 is fully opened as illustrated in FIG. 8A.

Figure 9A:
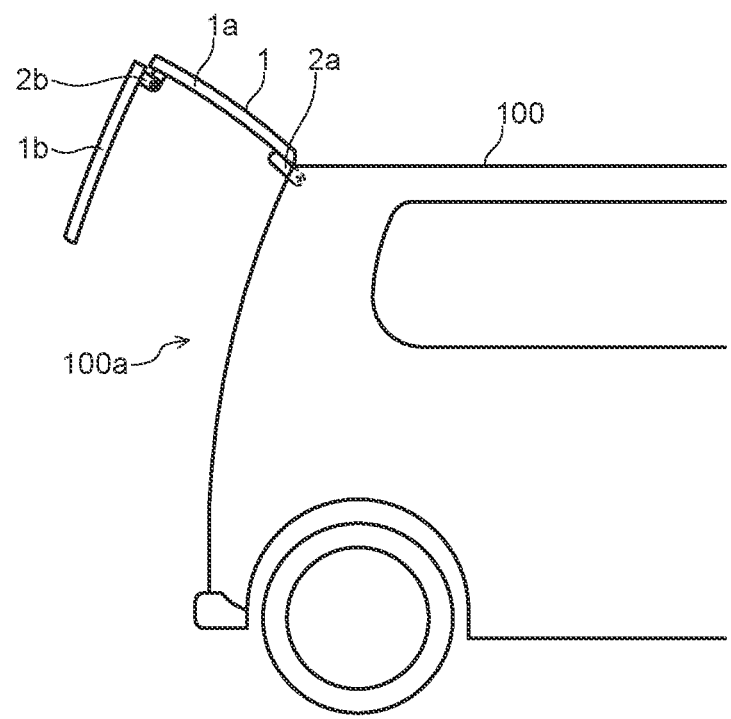
FIG. 9A is still another diagram for describing the operation of driving device 10.
Figure 9B:
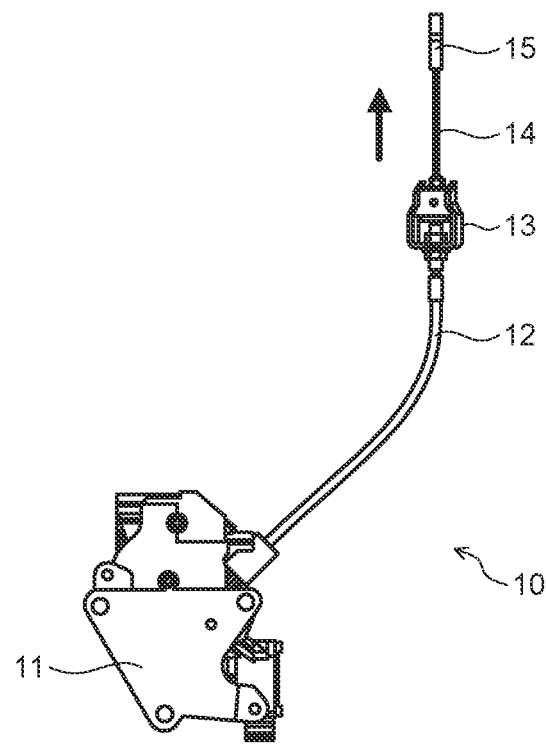
FIG. 9B is still another diagram for describing the operation of driving device 10.

When door 1 in a fully-opened state is closed, cable 14 is unwound as illustrated in FIG. 9B, lower door 1b hangs down by gravity in accordance with the amount of cable 14 that has been unwound as illustrated in FIG. 9A, and the degree of folding of lower door 1b with respect to upper door 1a increases.

Figure 10A:
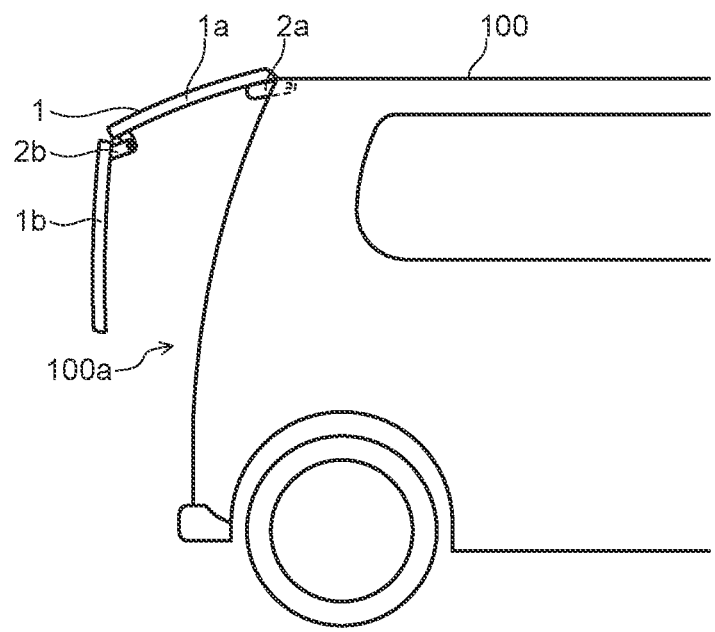
FIG. 10A is still another diagram for describing the operation of driving device 10.
Figure 10B:
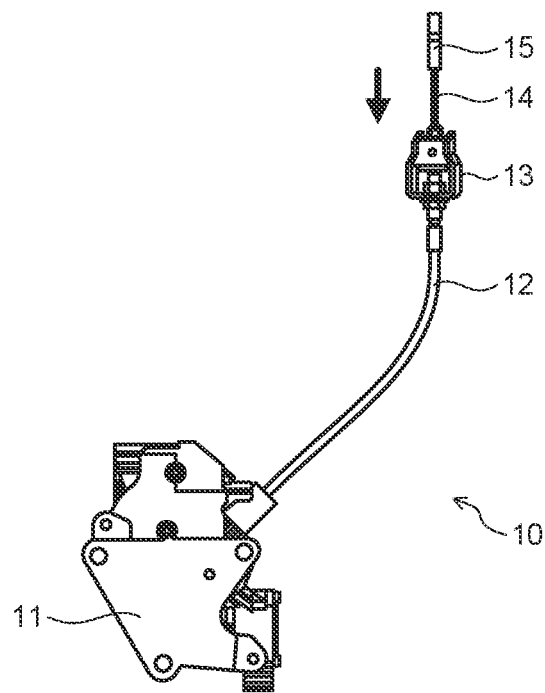
FIG. 10B is still another diagram for describing the operation of driving device 10.

When the closing operation of upper door 1a starts as illustrated in FIG. 10A after cable 14 is unwound for a predetermined amount, cable 14 is wound along with the closing operation of upper door 1a as illustrated in FIG. 10B.

This increases the tensile force by which upper door 1a and lower door 1b are pulled toward each other. Then, the flat portion at the end portion of lower door 1b is pushed against the flat portion at the end portion of upper door 1a, which results in decreasing the degree of folding of lower door 1b with respect to upper door 1a. As described above, winding cable 14 along with the closing operation of upper door 1a can avoid the contacting of the lower end portion of lower door 1b with the vehicle body.

Figure 11A:
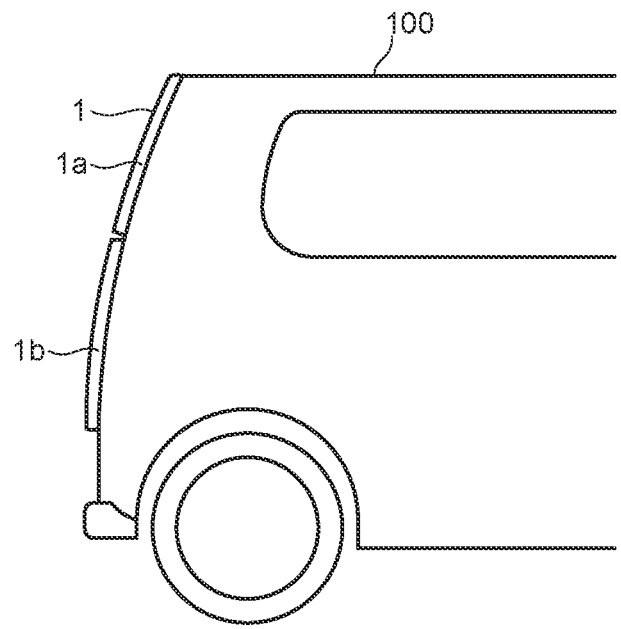
FIG. 11A is still another diagram for describing the operation of driving device 10.
Figure 11B:
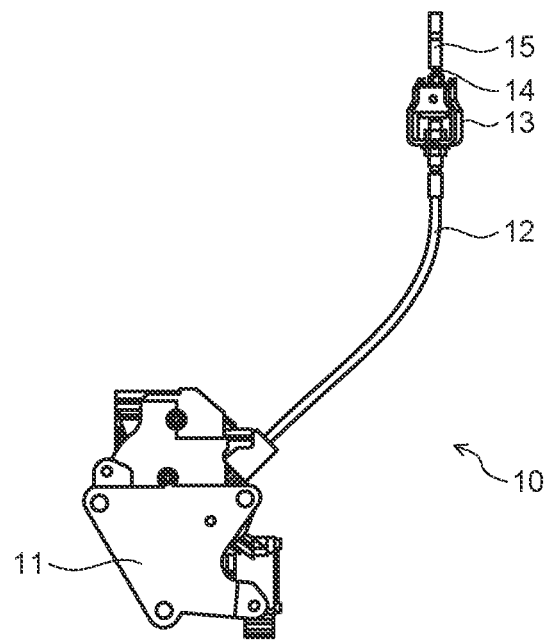
FIG. 11B is still another diagram for describing the operation of driving device 10.

When the closing operation of upper door 1a and the winding of cable 14 continue, door 1 is fully closed while the degree of folding of lower door 1b with respect to upper door 1a is the smallest as illustrated in FIG. 11A.

As described above, in driving device 10 according to the present embodiment, driving portion 11 is provided at a position spaced apart from hinge 2b serving as a connecting portion by a predetermined distance. Then, in adjusting portion 60, cable 14 for changing the degree of folding of lower door 1b with respect to upper door 1a by the driving force generated by the motor of driving portion 11b is used.

Therefore, when lower door 1b is a door in which a recessed portion recessed from the inside of the vehicle toward the outside of the vehicle is formed, driving portion 11 can be provided in a space formed in the recessed portion of lower door 1b. Thus, the recessed portion of lower door 1b can be effectively used, and the narrowing of the load compartment by driving portion 11 can be avoided.

In a conventional driving unit, a motor is combined with a hinge to drive a lower door of a folding type tailgate. In this case, the capacity of the motor is determined depending on specifications such as the weight of the door, and it is likely that the motor having a higher capacity is large in size, which makes it difficult to place the motor in combination with the hinge. As a result, the degree of freedom in designing the door is possibly limited.

On the other hand, mounting driving portion 10 according to the present embodiment on folding type lower door 1b at any position can enhance the degree of freedom in designing door 1.

Hereinafter, variations of driving device 10 according to the embodiment of the present invention will be described with reference to FIGS. 12 and 17.

Figure 12:
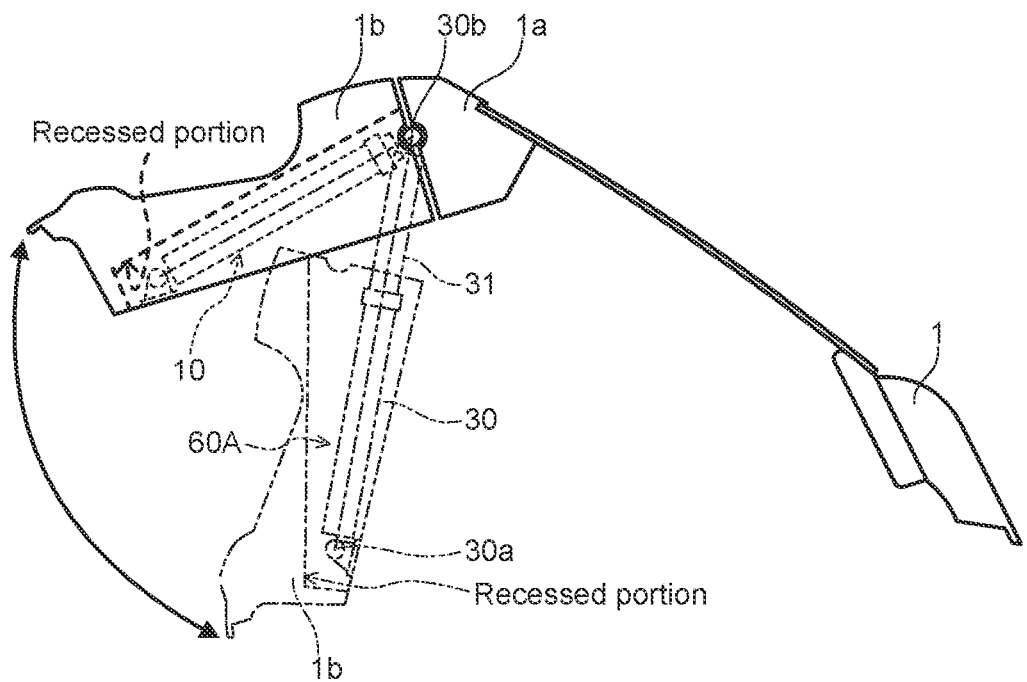
FIG. 12 is a diagram for describing Variation 1 of driving device 10 according to the embodiment of the present invention.

FIG. 12 is a diagram for describing Variation 1 of driving device 10 according to the embodiment of the present invention. Driving device 10 according to Variation 1 is a device that drives door 1 by changing a rotational motion of the motor into a linear motion.

Driving device 10 according to Variation 1 includes driving portion 30, shaft portion 31 that is housed in driving portion 30 and moves forward and backward with respect to driving portion 30. In driving device 10 according to Variation 1, shaft portion 31 moves forward and backward with respect to driving portion 30 to generate a driving force for driving upper door 1a or lower door 1b.

The lower end portion of driving portion 30 is connected to the vicinity of the lower end portion of lower door 1b by first connecting portion 30a. First connecting portion 30a is formed of a ball joint, a pin joint, a universal joint, or the like.

The upper end portion of shaft portion 31 is connected to the vicinity of the lower end portion of upper door 1a by second connecting portion 30b. Second connecting portion 30b is also formed of a ball joint, a pin joint, a universal joint, or the like. Second connecting portion 30b is an example of a connecting portion that connects upper door 1a and shaft 31.

As illustrated in FIG. 12, driving portion 30 is provided at a position spaced apart from second connecting portion 30b by a predetermined distance. Further, driving portion 30 includes a motor and a power transmission portion such as a planetary gear or a screw nut that transmits the rotation of the motor to shaft portion 31.

[Configuration of Adjusting Portion 60A]

Adjusting portion 60A illustrated in FIG. 12 increases the degree of folding of lower door 1b with respect to upper door 1a or decrease the degree of folding of lower door 1b with respect to upper door 1a based on the driving force generated by the motor. Specifically, adjusting portion 60A includes the above-described power transmission portion and shaft portion 31.

Adjusting portion 60A extends and retracts shaft portion 31 by changing the rotational motion of the motor into a linear motion by the power transmission portion.

When the motor of driving portion 30 rotates in the forward direction, the rotational motion of the motor is changed into a linear motion by the power transmission portion, and the linear motion is transmitted to shaft portion 31. This moves shaft portion 31 forward. The forward motion means that shaft portion 31 moves from the inside of driving portion 30 toward the outside of driving portion 30. The forward motion also means that shaft portion 31 extends from the inside of driving portion 30 toward the outside of driving portion 30.

As shaft portion 31 moves forward, lower door 1b hangs down, so that the degree of folding of lower door 1b with respect to upper door 1a increases.

On the other hand, when the motor of driving portion 30 rotates in the opposite direction, shaft portion 31 moves backward. The backward motion means that shaft portion 31 moves from the outside of driving portion 30 toward the inside of driving portion 30. The backward motion also means that shaft portion 31 retracts from the outside of the driving portion 30 toward the inside of driving portion 30.

As shaft portion 31 moves backward, the flat portion at the end portion of lower door 1b is pushed against the flat portion at the end portion of upper door 1a, which decreases the degree of folding of lower door 1b with respect to upper door 1a.

As described above, in driving device 10 according to Variation 1, driving portion 30 is provided at a position spaced apart from second connecting portion 30b serving as a connecting portion by a predetermined distance. Then, in adjusting portion 60A, shaft portion 31 that connects to upper door 1a and lower door 1b and performs extension and retraction using the driving force generated by driving portion 30 is used.

Therefore, when lower door 1b is a door in which a recessed portion as described above is formed, driving portion 30 can be provided in a space formed in the recessed portion of lower door 1b. Thus, the recessed portion of lower door 1b can be effectively used, and the narrowing of the load compartment by driving portion 30 can be avoided. As a result, applying driving device 10 according to Variation 1 to folding type door 1 can enhance the degree of freedom in designing door 1.

Figure 13:
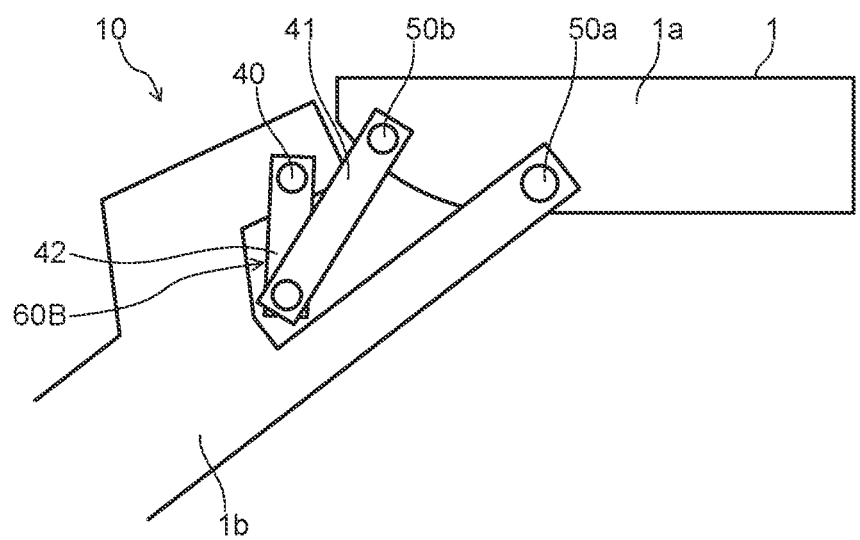
FIG. 13 is a diagram for describing Variation 2 of driving device 10 according to the embodiment of the present invention.

FIG. 13 is a diagram for describing Variation 2 of driving device 10 according to the embodiment of the present invention. Driving device 10 according to Variation 2 is a device that drives door 1 with a link mechanism by which the rotational force of the motor is transmitted.

Driving device 10 according to Variation 2 includes driving portion 40, first link 41 connected to upper door 1a, and second link 42 connected to lower door 1b.

[Configuration of Driving Portion 40]

Driving portion 40 is provided to lower door 1b, and is a device that generates a driving force for driving lower door 1b by rotating second link 42. Driving portion 40 includes a motor and a rotation shaft connected to second link 42.

One end of second link 42 is connected to the rotation shaft of driving portion 40. The other end of second link 42 is rotatably connected to one end of first link 41. The other end of first link 41 is rotatably connected to upper door 1a.

Lower door 1b is rotatably connected to upper door 1a via hinges 50. Further, driving portion 40 is provided at a position spaced apart from hinge 50 by a predetermined distance.

Hinge 50 is formed of a ball joint, a pin joint, a universal joint, or the like.

[Configuration of Adjusting Portion 60B]

Adjusting portion 60B illustrated in FIG. 13 increases the degree of folding of lower door 1b with respect to upper door 1a or decreases the degree of folding of lower door 1b with respect to upper door 1a based on the driving force generated by the motor. Specifically, adjusting portion 60B includes the above-described rotation shaft of driving portion 40, first link 41, and second link 42.

Adjusting portion 60B changes the degree of folding of lower door 1b with respect to upper door 1a by changing the rotational motion of the rotation shaft of driving portion 40 into a linear motion by first link 41 and second link 42.

Next, an operation of driving device 10 according to Variation 2 will be described with reference to FIGS. 14 to 17. In the following description, the operation of increasing the degree of folding of lower door 1b with respect to upper door 1a will be described with reference to FIGS. 14 and 15, and the operation of decreasing the degree of folding of lower door 1b with respect to upper door 1a will be described with reference to FIGS. 16 and 17.

Figure 14:
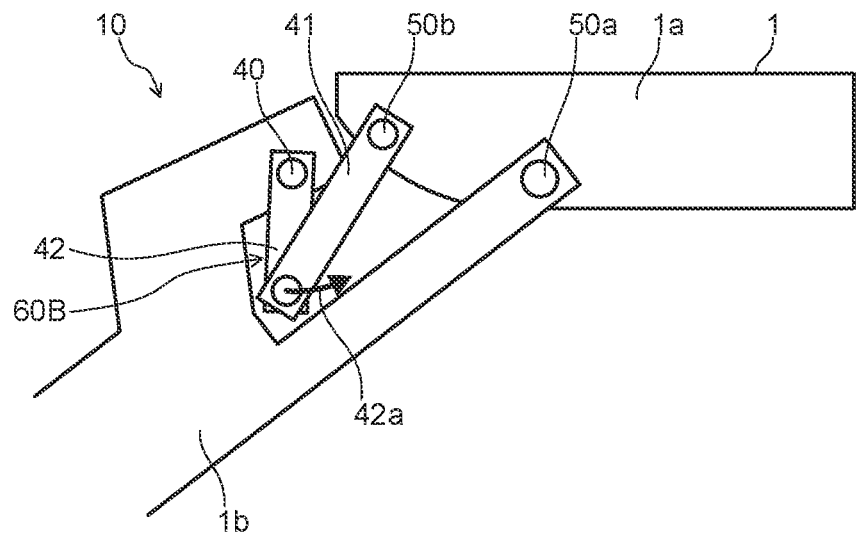
FIG. 14 is a diagram for describing an operation when the degree of folding of lower door 1*b* with respect to upper door 1*a* is increased.
Figure 15:
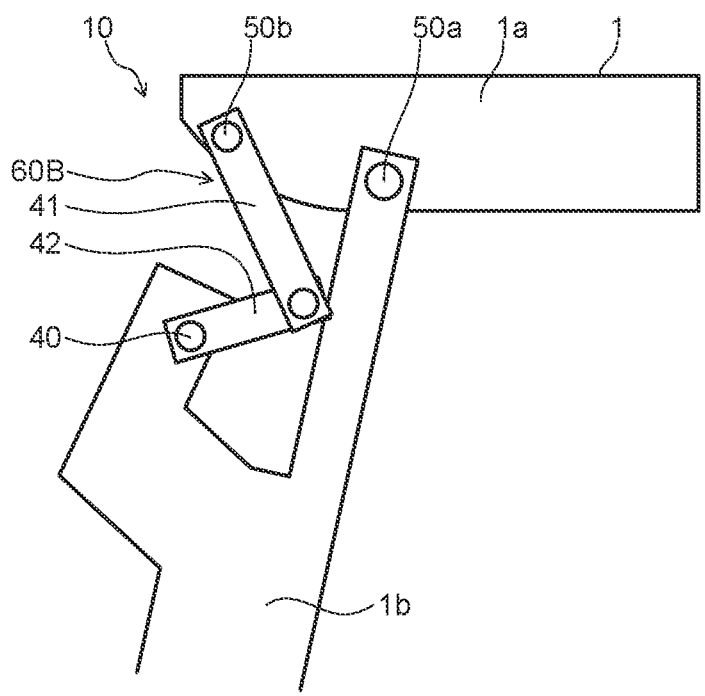
FIG. 15 is another diagram for describing the operation when the degree of folding of lower door 1*b* with respect to upper door 1*a* is increased.

FIGS. 14 and 15 are diagrams for describing an operation when the degree of folding of lower door 1b with respect to upper door 1a is increased.

As illustrated in FIG. 14, when the motor included in driving portion 40 rotates in the forward direction while the degree of folding of lower door 1b with respect to upper door 1a is small, the rotational motion of the motor is transmitted to second link 42 via the rotation shaft. Then, second link 42 rotates in the direction of first rotational direction 42a about the rotation shaft.

This increases the angle formed by first link 41 and second link 42 as illustrated in FIG. 15, and also increases the degree of folding of lower door 1b with respect to upper door 1a.

Figure 16:
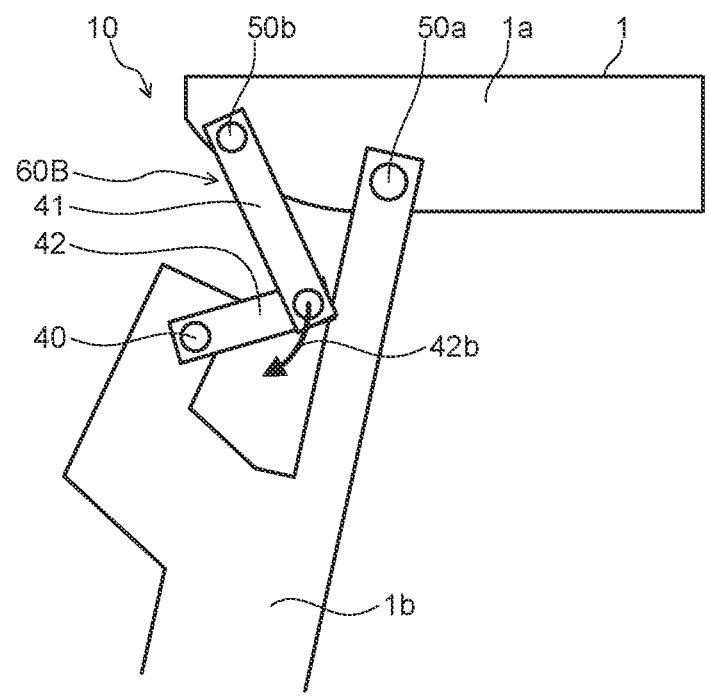
FIG. 16 is a diagram for describing an operation when the degree of folding of lower door 1*b* with respect to upper door 1*a* is decreased.
Figure 17:
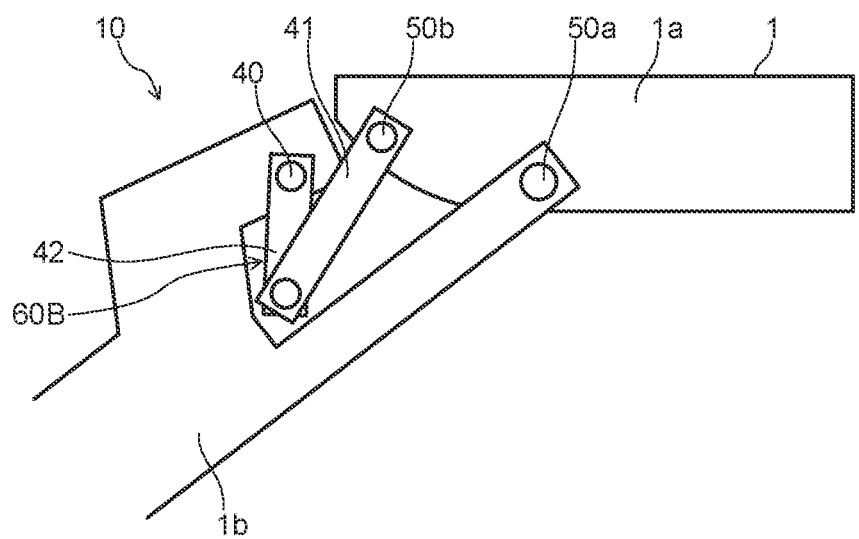
FIG. 17 is another diagram for describing the operation when the degree of folding of lower door 1*b* with respect to upper door 1*a* is decreased.

FIGS. 16 and 17 are diagrams for describing an operation when the degree of folding of lower door 1b with respect to upper door 1a is decreased.

As illustrated in FIG. 16, when the motor included in driving portion 40 rotates in the opposite direction while the degree of folding of lower door 1b with respect to upper door 1a is large, the rotational motion of the motor is transmitted to second link 42 via the rotation shaft. Then, second link 42 rotates in the direction of second rotational direction 42b opposite to first rotational direction 42a about the rotation shaft.

As second link 42 continues to rotate in the direction of second rotational direction 42b, the angle formed by first link 41 and second link 42 decreases, and the degree of folding of lower door 1b with respect to upper door 1a also decreases as illustrated in FIG. 17.

As described above, in driving device 10 according to Variation 2, driving portion 40 is provided at a position spaced apart from hinges 50a and 50b by a predetermined distance. Then, in adjusting portion 60B, first link 41 and second link 42 for changing the degree of folding of lower door 1b with respect to upper door 1a by the driving force generated by the motor of driving portion 40 is used.

Thus, even when the weight of lower door 1b increases, torque generated in driving portion 40 can be easily changed by adjusting the length of first link 41 and second link 42; therefore, lower door 1b can be driven without increasing the size of the motor. As a result, applying driving device 10 according to Variation 2 to folding type door 1 can enhance the degree of freedom in designing door 1.

Note that, for example, the following aspects are also understood to fall within the technical scope of the present disclosure.
  (1) A driving device is a driving device driving a door that includes an upper door and a lower door rotatably connected to the upper door, and includes: a driving portion that is provided at a position spaced apart from a connecting portion rotatably connecting the upper door and the lower door and generates a driving force for driving the upper door or the lower door; and an adjusting portion that changes a degree of bending of the lower door with respect to the upper door based on the driving force.
  (2) The adjusting portion includes a cable laid over from the upper door to the lower door, unwinds the cable when increasing the degree of folding of the lower door with respect to the upper door, and winds the cable when decreasing the degree of folding of the lower door with respect to the upper door.
  (3) The adjusting portion includes a shaft portion connected to the upper door and the lower door and performing extension and retraction, extends the shaft portion when increasing the degree of folding of the lower door with respect to the upper door, and retracts the shaft portion when decreasing the degree of folding of the lower door with respect to the upper door.
  (4) The adjusting portion includes a first link connected to the upper door and a second link connected to the lower door, increases an angle formed by the first link and the second link when increasing the degree of folding of the lower door with respect to the upper door, and decreases the angle when decreasing the degree of folding of the lower door with respect to the upper door.
  (5) The connecting portion includes two connecting portions spaced apart from each other in a vehicle width direction, and at least one of the driving portion and/or the adjusting portion is placed between the two connecting portions.
  (6) The lower door is a door in which a recessed portion recessed from an inside of a vehicle toward an outside of the vehicle is formed, and at least one of the driving portion and/or the adjusting portion is provided in a space formed in the recessed portion.

It should be understood that the embodiment disclosed herein is illustrative and non-restrictive in all respects. It is intended that the scope of the invention be defined by the appended claims rather than the above description, and that all changes within the meaning and range of equivalency of the claims be included in the claims.

The embodiment of the present invention has been described above. It should be noted that the above description is illustrative of a preferred embodiment of the present invention, and the scope of the present invention is not limited thereto. That is, the configuration of the device and the shape of each part are merely examples, and it is obvious that various modifications and additions to these examples are possible within the scope of the present invention.

INDUSTRIAL APPLICABILITY

The driving device according to the present invention is useful as a device capable of enhancing the degree of freedom in designing a door.

REFERENCE SIGNS LIST

1 Door
1a Upper door
1b Lower door
2a Hinge
$2a_1$ Hinge
$2a_2$ Hinge
2b Hinge
$2b_1$ Hinge
$2b_2$ Hinge
10 Driving device
11 Driving portion
12 Outer casing
13 Guide portion
13a Guide
13b Bracket
13c Stopper
14 Cable
15 Cable end
30 Driving portion
30a First connecting portion
30b Second connecting portion
31 Shaft portion
40 Driving portion
41 First link
42 Second link
42a First rotational direction
42b Second rotational direction
50a Hinge
50b Hinge
60 Adjusting portion
60A Adjusting portion
60B Adjusting portion
100 Vehicle
100a Opening portion

The invention claimed is:
1. A driving device configured to drive a door that includes an upper door rotatably connected to a vehicle body and a lower door which is rotatably connected to the upper door and in which a recessed portion recessed from an inside of a vehicle toward an outside of the vehicle is formed, the driving device comprising:
   an adjusting portion that is provided within a space formed by the recessed portion of the lower door at a position spaced apart from a connecting portion rotatably connecting the upper door and the lower door, wherein:
   the adjusting portion comprises:
   a driving portion having one end connected to the lower door and configured to generate a driving force for driving the upper door or the lower door; and
   a shaft portion having one end connected to the upper door and configured to move forward and backward such that an other end side of the shaft portion moves forward and backward with respect to another end of the driving portion to increase or decrease a length of the adjusting portion
   the shaft portion is operable based on the driving force such that a degree of folding of the lower door with respect to the upper door is increased when the shaft portion moves forward and increases the length of the adjusting portion and the degree of folding of the lower door with respect to the upper door is decreased when the shaft portion moves backward and decreases the length of the adjusting portion, and
   the driving portion is located within the space regardless of whether the shaft portion is in a forward position or in a backward position, while the shaft portion is located within the space when the shaft portion is in the backward position and the other end side of the shaft portion protrudes from the space when the shaft portion is in the forward position.

2. The driving device according to claim 1, wherein
the connecting portion includes two connecting portions spaced apart from each other in a vehicle width direction, and
the driving portion and the shaft portion are placed between the two connecting portions.

* * * * *